United States Patent [19]
Ginster

[11] Patent Number: 4,530,192
[45] Date of Patent: Jul. 23, 1985

[54] GLAZING SUPPORTS

[75] Inventor: Helmut Ginster, Viersen, Fed. Rep. of Germany

[73] Assignee: Draftex Development AG, Zug, Switzerland

[21] Appl. No.: 472,951

[22] Filed: Mar. 7, 1983

[30] Foreign Application Priority Data

Mar. 27, 1982 [DE] Fed. Rep. of Germany ....... 8209097

[51] Int. Cl.³ ............................................... E06B 3/62
[52] U.S. Cl. .......................................... 52/397; 52/716
[58] Field of Search ................... 52/397, 400, 716–718, 52/403, 208, 211; 246/84 R

[56] References Cited

U.S. PATENT DOCUMENTS

| 2,610,713 | 9/1952 | Bradley | 52/717 |
| 2,610,714 | 9/1952 | Bradley | 52/717 |
| 3,815,303 | 6/1974 | Ziegler | 52/400 |
| 4,343,121 | 8/1982 | Kruschwitz et al. | 52/397 |
| 4,347,693 | 9/1982 | Kruschwitz | 52/716 |

FOREIGN PATENT DOCUMENTS

| 2041407 | 8/1970 | Fed. Rep. of Germany . |
| 1355303 | 4/1973 | United Kingdom . |

Primary Examiner—James L. Ridgill, Jr.
Attorney, Agent, or Firm—Leydig, Voit, Osann, Mayer & Holt, Ltd.

[57] ABSTRACT

A windscreen mounting arrangement for a motor vehicle comprises an integral extrusion defining to channels facing in opposite directions. One channel grips a flange surrounding the windscreen opening, and the windscreen glass is fitted into the other channel. After that, a stiffening member is placed in a groove in the extrusion to hold the glass in position. A metal reinforcing carrier embedded in the extrusion has a channel-shaped portion embracing one channel and an integral sideways extension which is embedded within the material defining the base of the other channel. This sideways extension facilitates initial fitting of the windscreen mounting arrangement onto the flange and stabilizes the mounting arrangement when it is bent to follow curves in windscreen openings.

7 Claims, 3 Drawing Figures

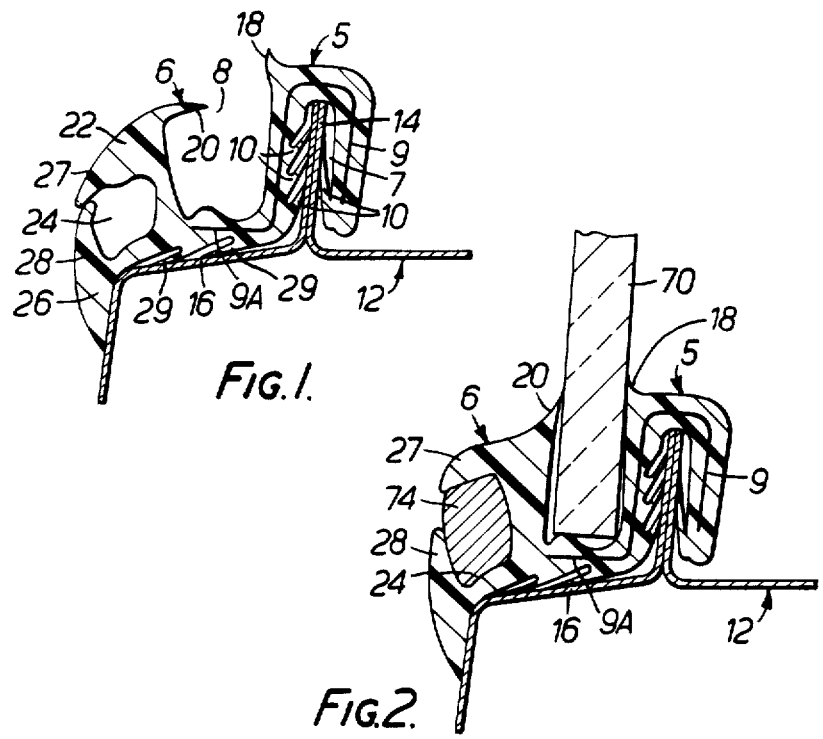
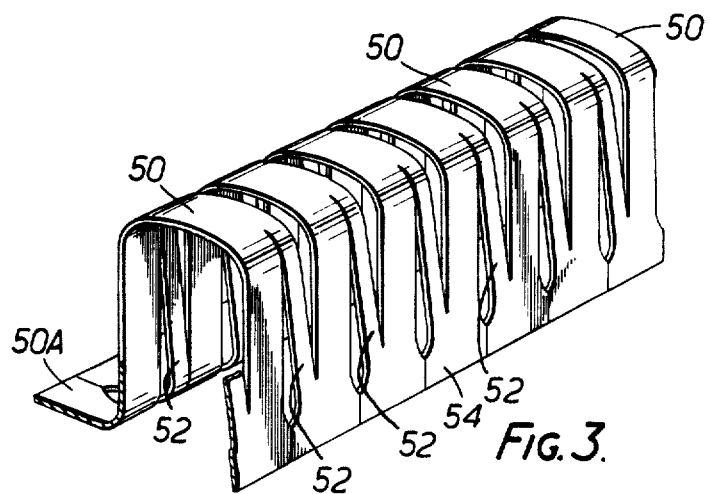

GLAZING SUPPORTS

BACKGROUND OF THE INVENTION

The invention relates to mounting arrangements for mounting window glass, such as, for example, for mounting motor vehicle windscreens.

SUMMARY OF THE INVENTION

According to the present invention, there is provided a window glass mounting arrangement comprising flexible material which is formed to define first and second channels substantially side-by-side and facing in opposite directions, the first channel being sized to fit over and grip a support member surrounding the window opening so that the second channel then runs alongside the window opening for receiving the window glass and a reinforcing carrier being embedded in at least that part of the flexible material forming the base of the second channel.

According to the present invention, there is also provided a window glass mounting arrangement, comprising flexible material which is formed to define first and second channels substantially side-by-side and facing in opposite directions, the first channel being sized to fit over and grip a support member surrounding the window opening so that the second channel then runs alongside the window opening for receiving the window glass, the wall of the second channel furthest from the first channel having means for receiving a stiffening member for stiffening that wall so as to secure the window glass in the second channel, the material having embedded in it a reinforcing carrier of which a portion is generally channel-shaped and embedded within that part of the material defining the first channel and of which another, integral, portion is embedded in that part of the flexible material forming the base of the second channel.

DESCRIPTION OF THE DRAWINGS

Mounting arrangement embodying the invention and for mounting a motor vehicle windscreen in a vehicle body will now be described, by way of example, with reference to the accompanying diagrammatic drawings in which:

FIGS. 1 and 2 are cross-sections through the mounting arrangement, FIG. 1 showing it ready to receive the window glass and FIG. 2 showing the window glass locked in position; and FIG. 3 is a plan view of one form which a metal carrier or reinforcement in the mounting arrangement can have.

DESCRIPTION OF PREFERRED EMBODIMENTS

The mounting arrangement is made of resilient material such as plastics or rubber material and comprises first and second integral parts 5 and 6 which define respective channels 7 and 8 facing in generally opposite directions. The parts 5 and 6 are reinforced with a metal core or carrier 9, as will be explained in more detail below, and the opposite inside facing walls of the channel defined by the part 5 are provided with integral gripping lips 10. In use, and as shown in FIG. 1, the mounting arrangement is fitted onto the motor vehicle body 12 so that the channel 7 of the part 5 is placed over, and grips the opposite sides of a flange 14 which forms part of the vehicle bodywork and runs around the windscreen opening.

When the part 5 is so fitted, the part 6 lies alongside it, but outside the windscreen opening, and rests, in this example, on a part 16 of the vehicle body.

One of the inside walls of the part 6 defines a rib 18 and the other has a projecting tongue 20. The free side wall 22 of the part 6 defines a groove 24 and this side wall of the part 6 is extended to form a tongue 26. The groove 24 has an open mouth but this is partially closed off by overlapping flaps 27 and 28. The base of the part 6, that is, the region resting on the bodywork surface 16, is provided with flexible tongues 29.

The metal carrier 9 is completely embedded in the resilient material of the parts 5 and 6. The portion of it within the part 5 is generally channel-shaped, and one of its side walls is extended outwardly at approximately 90° to form an extension 9A which lies within the part 6 and below the base of the channel 8.

FIG. 3 shows one form which the metal carrier may take.

As shown, it is in the form of a plurality of side-by-side elements 50 each of which is generally of inverted U-shape but with the free end of one of the legs of the U extended sideways at approximately 90° to form an extension 50A. The elements 50 are interconnected by integral inclined connecting links 52. In addition, the distal ends of the unextended legs of the U's are connected by marginal connections 54. However, it will be appreciated that this is merely one of many different forms which the carrier may take. For example, the elements of the carrier need not be connected to each other but can be entirely separate. Instead of being made from strip-like elements, the carrier may be made of looped wire.

The mounting arrangement may be produced by an extrusion process, using a cross-head extruder for embedding the metal carrier 9. The mounting arrangement may be made in a continuous ring sized to fit onto the bodywork flange 14 completely surrounding the windscreen opening.

A windscreen glass 70 (FIG. 2) is fitted into and secured in the mounting arrangement by placing the peripheral edge of the glass in the channel 8 after outwardly bending the wall 22 (if necessary, this process may be assisted by placing a cord or wire in the base of the channel 8 around the complete periphery and then pulling outwards, the cord being removed when the glass is seated in the channel to allow the wall 22 to resile). As shown in FIG. 2, a stiffening strip 74, made of metal for example, is then inserted into the groove 24 in the wall 22. The stiffening strip 74 runs around the entire windscreen opening and holds the windscreen glass 70 against dropping out either forwardly or rearwardly of the opening.

The carrier 9 is advantageous in providing the extension 9A under the base of the channel 8, because it is found that this extension greatly facilitates the fitting of the mounting arrangement onto the flange 14. In particular, the extension 9A stabilises the shape of the mounting arrangement where it is bent to fit round curves in the window opening.

What is claimed is:

1. A window glass mounting arrangement, comprising flexible material in strip form and sized to extend substantially around the whole of the opening for the window glass and which is formed to define first and second channels extending longitudinally along the length of the strip and arranged substantially side-by-side and with their mouths facing in opposite directions, the first channel being sized to fit over and grip a support member surrounding the window opening so that the second channel then runs alongside the window opening for receiving the window glass, a relatively rigid stiffening member, the wall of the second channel furthest from the first channel defining a longitudinal slot sized to receive the stiffening member whereby the stiffening member when so received stiffens that wall so as to secure the window glass in the second channel, and a flexible reinforcing carrier completely embedded in the flexible material, the flexible reinforcing carrier extending for the full length of the strip and of which a portion is generally channel-shaped and embedded in that part of the material defining the first channel and of which another, integral, portion is embedded in that part of the flexible material forming the base of the second channel.

2. An arrangement according to claim 1, in which the flexible material defining the first channel includes integral gripping lips extending inwardly from its opposite inside side walls and running longitudinally along the length of the channel.

3. An arrangement according to claim 2, in which the said other portion of the reinforcing carrier extends transversely to one side wall of the channel-shaped portion of the carrier from adjacent the mouth of the channel-shape.

4. An arrangement according to claim 2, in which the carrier comprises a series of side-by-side metal elements each of which has a part which is generally U-shaped, so that together these parts define the said channel-shape, one leg of each such U-shaped part being extended outwardly in a transverse direction from the open end of the U so that together these extensions define the said other portion of the carrier.

5. An arrangement according to claim 4, in which the said elements of the carrier are interconnected with each other by flexible metal connecting links.

6. An arrangement according to claim 5, in which the connecting links are inclined to the directions of extensions of the legs of the U's.

7. A window glass mounting arrangement, comprising flexible material in strip form and sized to extend substantially around the whole of the opening for the window glass and which is formed to define first and second channels extending longitudinally along the length of the strip and arranged substantially side-by-side and with their mouths facing in opposite directions, the first channel being sized to fit over and grip a support member surrounding the window opening so that the second channel then runs alongside the window opening for receiving the window glass, the wall of the second channel furthest from the first channel having means for receiving a stiffening member for stiffening that wall so as to secure the window glass in the second channel, and a reinforcing carrier completely embedded in the flexible material, reinforcing the reinforcing carrier extending for the full length of the strip and of which a portion is generally channel-shaped and embedded in that part of the material defining the first channel and of which another, integral, portion is embedded in that part of the flexible material forming the base of the second channel, the carrier comprising a series of side-by-side metal elements each of which has a part which is generally U-shaped, so that together these parts define the said channel-shape, one leg of each such U-shaped part being extended outwardly in a transverse direction from the open end of the U so that together these extensions define the said other portion of the carrier, the distal ends of the legs of the U's which are not extended in a transverse direction being interconnected by marginal connections.

* * * * *

UNITED STATES PATENT AND TRADEMARK OFFICE
CERTIFICATE OF CORRECTION

PATENT NO.   : 4,530,192
DATED        : July 23, 1985
INVENTOR(S)  : Helmut Ginster It is certified that error appears in the above-identified patent and that said Letters Patent is hereby corrected as shown below:

Please amend the following reference on patent cover page at Reference No. [30], Line 11:

"Mar. 27, 1982 [DE] Fed. Rep. of Germany .... 8209097" to read -- Mar. 27, 1982 [UK] United Kingdom .... 8209097 --.

Signed and Sealed this

Twenty-first Day of January 1986

[SEAL]

Attest:

DONALD J. QUIGG

Attesting Officer

Commissioner of Patents and Trademarks